United States Patent [19]

Lewis

[11] 3,914,943
[45] Oct. 28, 1975

[54] RETURN MANIFOLD FOR HYDRAULIC BRAKE ACTUATOR

[75] Inventor: Richard L. Lewis, South Bend, Ind.

[73] Assignee: The Bendix Corporation, South Bend, Ind.

[22] Filed: June 20, 1974

[21] Appl. No.: 481,091

[52] U.S. Cl. .................................................. 60/585
[51] Int. Cl.² .......................................... B60T 11/26
[58] Field of Search...... 60/585, 591, 534, 586–589, 60/592

[56] References Cited
UNITED STATES PATENTS

| 3,520,136 | 7/1970 | Stiward | 60/534 X |
| 3,555,822 | 1/1971 | Rivetti | 60/534 X |

FOREIGN PATENTS OR APPLICATIONS

| 998,697 | 9/1951 | France | 60/585 |

Primary Examiner—Martin P. Schwadron
Assistant Examiner—H. Burks
Attorney, Agent, or Firm—Ken C. Decker; William N. Antonis

[57] ABSTRACT

A unique fluid storage structure for a hydraulic brake actuator is disclosed. The actuator includes a housing having radially extending apertures through the wall thereof to communicate fluid into a bore defined within the housing. Tubular extensions are cast integral with the housing and circumscribe each of the apertures. A threaded plug is screwed into each of the aforementioned extensions, and one end of some of the plugs is recessed to define a cavity which receives a tilt valve which controls communication through the apertures between the fluid storage structure and the bore. The fluid storage structure further includes a molded manifold including a tubular member having bosses projecting radially with respect thereto. The cross section of the bosses is complementary to the cross section of the opposite end of the plugs, and the distance between the bosses on the manifold is complementary to the distance between the extensions on the housing, so that, when the manifold is installed on the housing, the opposite ends of the plugs are received within the bosses on the manifold. A band is crimped around the outer circumferential surface of each of the bosses on the manifold to hold them in sealing engagement with the opposite ends of the plugs.

10 Claims, 1 Drawing Figure

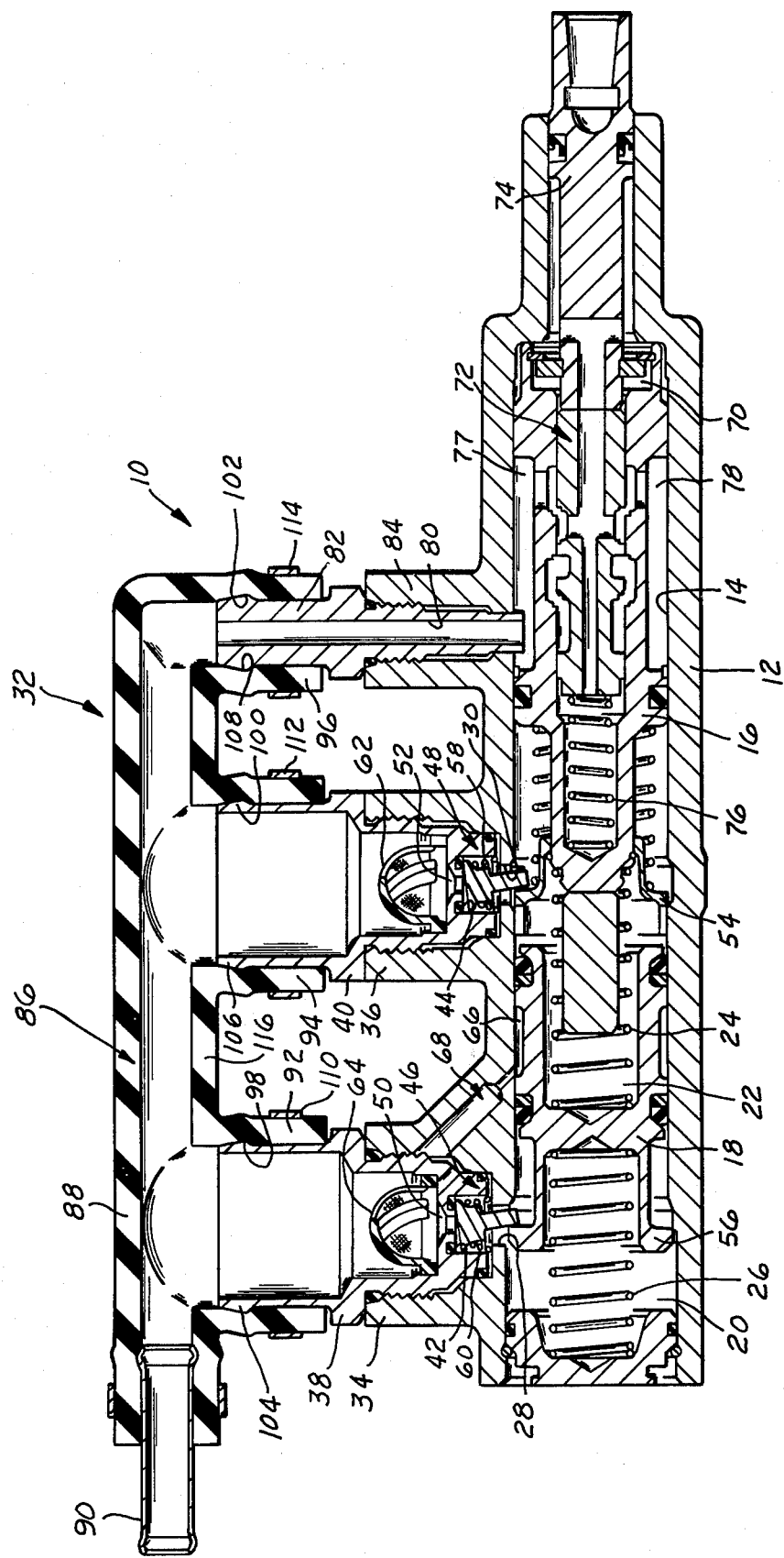

RETURN MANIFOLD FOR HYDRAULIC BRAKE ACTUATOR

BACKGROUND OF THE INVENTION

This invention relates to a fluid storage structure for a hydraulic brake actuator.

Existing fluid storage structures used in, for example, vehicle hydraulic brake actuators, are rather bulky and heavy, since they are commonly made out of cast iron, as is the body of the hydraulic actuator. While the body of the actuator must be made from rather strong material because of the pressure levels generated therein, the fluid storage structure is always at substantially atmospheric pressure so that it may be made of lighter weight material. The present invention provides a return manifold which is molded from a plastic or rubber material and which is used in lieu of the relatively heavy reservoir on existing devices.

SUMMARY OF THE INVENTION

Therefore, an important object of my invention is to provide a fluid storage structure for a hydraulic brake actuator which is substantially lighter than most prior art devices.

Another important object of my invention is to provide an improved fluid storage structure for a hydraulic brake actuator which represents a significant cost saving over the prior art structures.

DESCRIPTION OF THE DRAWINGS

The sole FIGURE of the drawings is a longitudinal cross-sectional view of a hydraulic brake actuator made pursuant to the teachings of the present invention.

DETAILED DESCRIPTION

Referring now to the drawing, the hydraulic brake actuator generally indicated by the numeral 10 includes a housing 12 defining a bore 14 therewithin. A pair of coaxial pistons 16, 18 are slidably mounted in the bore 14. A first braking circuit pressure chamber 20 is defined between the end of piston 18 and the corresponding end of the bore 14, and a second braking circuit pressure chamber 22 is defined between the contiguous ends of the pistons 16 and 18. The braking pressure chamber 22 is communicated to the front wheel brakes of the vehicle, and the pressure chamber 20 is communicated to the rear wheel brakes of the vehicle, as is conventional in the automotive arts. Return springs 24, 26 return the pistons 16 and 18 to the brake release position illustrated in the Drawing. Apertures 28, 30 extend radially through the wall of the bore 14 to communicate fluid into the chambers 20 and 22 upon brake release to replenish the fluid content therein.

A vessel generally indicated by the numeral 32 is provided to store fluid at atmospheric pressure to be communicated into the chambers 20 and 22. The vessel 32 is communicated to the system reservoir at the inlet of the vehicle power steering pump (not shown), in a manner which will be described later herein. Consequently, the fluid pressure level within the vessel 32 is substantially reservoir pressure. Vessel 32 includes circular bosses 34, 36 which are formed integrally with the housing 12 and which circumscribe the apertures 28 and 30, respectively. Threaded plugs 38, 40 are screwed into the bosses 34 and 36 and the lower ends of the plugs (viewing the FIGURE) are recessed to define chambers 42, 44 which contain tilt valves 46, 48. Openings 50, 52 are provided in the plugs 38 and 40 to communicate the chambers defined within the latter with the chambers 42, 44. The pistons 16 and 18 are provided with detents 54, 56 which are adapted to engage the lower ends of the tilt valves 48, 46, respectively, which project through the apertures 28, 30 and into the bore 14. Therefore, when the pistons are disposed to the position illustrated in the drawings, the detents 54, 56 maintain the valves 48, 46 open, so that substantially uninhibited fluid communication is permitted through the openings 52, 50 and corresponding apertures 30, 28. However, when the pistons are moved away from the positions illustrated in the drawings, springs 58, 60 yieldably urge the tilt valves 48, 46 into sealing engagement with the openings 52 and 50 to thereby prevent communication into the bore 14. Appropriate filters 62, 64 are disposed within the plugs 40, 38 to filter impurities from the fluid content thereof before communication of fluid into the bore 14. The annular area 66 defined between the seals on the piston 18 is vented to reservoir pressure in the plug 38 by passage means generally indicated by the numeral 68 which extends through the housing 12 and also through the plug 38.

The right hand end (viewing the FIGURE) of piston 16 cooperates with the corresponding end of the bore 14 to define a motor chamber 70 therebetween. A spool valve generally indicated by the numeral 72 is slidably mounted within the piston 16 and is actuated by an operator-actuated input rod 74. As can be seen in the drawing, the left hand end of the actuation rod 74 engages the spool valve 72 to shift the latter relative to the piston 16. The right hand end of the actuation rod 74 is connected to a standard brake pedal (not shown) mounted in the vehicle operator's compartment. A spring 76 yieldably urges the spool valve 72 to the position illustrated in the drawing, wherein the spool valve vents the chamber 70 to the vehicle system reservoir through circumferentially spaced slots 77, 78 on the piston 16 which in turn are communicated with a passage 80 defined within a plug 82 which is threadedly engaged with another boss 84 on the housing 12. The construction and operation of the spool valve 72 is described in detail in U.S. Pat. Nos. 3,532,027 and 3,802,195, and in U.S. Pat. application Ser. No. 481,090, filed June 20, 1974 all of which are owned by the assignee of the present invention and are incorporated herein by reference as need be for a more complete understanding of the present invention. Since construction and operation of the spool valve 72 forms no part of the present invention, it will not be more completely described herewithin, reference being made to the above-identified patents and application for such a description.

As discussed above, the spool valve 72, in the position illustrated in the drawing, vents the pressure chamber 70 to the passage 80 and consequently, to reservoir pressure. However, as the spool valve is shifted to the left viewing the FIGURE, the spool valve first terminates communiction between the chamber 70 and the passage 80 and thereafter communicates high pressure fluid from the appropriate vehicle pressure source into the motor chamber 70. Consequently, when a brake application is effected, the actuation rod 74 shifts spool valve 72 to the left viewing the FIGURE, communicating pressurized fluid into the chamber 70, which in turn reacts on the right hand face of the piston 16. The high pressure fluid in the motor chamber 70 urges the piston 16 to the left viewing FIG. 1. Since the piston 18 is a floating piston, movement of the piston 16 pressurizes the fluid in the chamber 22 which in turn acts through the piston 18 to pressurize the fluid in the chamber 20. Pressurized fluid in the chambers 22 and 20 are communicated to the front and rear brakes of the vehicle, respectively, as described hereinabove. Of course, upon initial movement of the pistons away from the brake release position illustrated in the drawings, the tilt valves 46 and 48 close, thereby permitting pressurization of the fluid in the chambers 20 and 22. Upon release of the brakes, the springs 76, 24 and 26 urge the spool valve 72 and the pistons 16 and 18 to the brake-released positions illustrated in the drawings, wherein the detents 54 and 56 on the pistons open the tilt valves 48 and 46 to permit replenishing of the fluid pressure content of the chambers 22 and 20.

Vessel 32 further includes a molded manifold generally indicated by the numeral 86. The manifold 86 may be molded from any appropriate material, such as rubber or plastic. Manifold 86 includes a tubular member 88 which extends generally parallel with the axis of the bore 14. One end of the tubular member 88 is provided with connecting device 90 which is adapted for connection with a conduit or other means of fluid communication so that the tubular member 88 is communicated to the system reservoir at the inlet or low pressure side of the vehicle power steering pump (not shown). Bosses 92, 94, and 96 extend from the tubular member 88 at substantially right angles with respect thereto. The inner circumferential surface of the bosses 92, 94, and 96 are complementary to the outer circumferential surface of the plugs 38, 40 and 82 and the spacing between the bosses 92, 94 and 96 is also complementary to the spacings between the plugs 38, 40 and 82, so that the manifold may be installed on the plugs in the manner illustrated in the drawings, with the upper ends of the plugs being received within the corresponding bosses. Circumferentially extending detents 104, 106 and 108 on the plugs 38, 40, and 82 are received within corresponding recesses 98, 100 and 102 on the bosses 92, 94, 96. The recesses may either be molded in the portion 86, or, since the portion 86 is made from a relatively soft material, the fit between the plugs and the bosses 92, 94, 96 will deform the latter to provide the recesses. Bands 110, 112 and 114 circumscribe the bosses 92, 94, and 96, respectively, and are crimped thereabout to thereby hold each boss into sealing engagement with its corresponding plug. Consequently, the bands, the detents, and the recesses, assure a fluid-tight connection when the portion 86 is installed on the plugs.

During a hard deceleration, some fluid may be transferred from the compartment defined within one of the plugs to the compartment defined within the other plug. If necessary to prevent this from occurring, the length of the wall portion 116 of tubular member 88 may be extended so that it projects into the chambers defined by the plugs 38 and 40 to reduce the size of the openings of the corresponding bosses into the tubular member 88, thereby making it more difficult for fluid to be transferred from the chambers defined in the plug during a hard vehicle deceleration.

I claim:

1. In a hydraulic brake actuator:
a housing defining a bore therewithin;
apertures extending through the housing for communicating fluid into said bore; and
a vessel carried by said housing, said vessel holding separated fluid quantities to be communicated through corresponding apertures, said vessel including tubular extensions carried by said housing, one of said tubular extensions circumscribing each of said apertures, and a manifold comprising a tubular member having tubular bosses extending therefrom for each of said tubular extensions, each of said tubular bosses having a cross section complementary to the cross section of a corresponding tubular extension, one end of each boss defining an opening equal to the cross-sectional area of the boss for receiving a corresponding extension, the distance between said bosses being substantially equal to the distance between said extensions so that each of said extensions are connected to a corresponding boss when said manifold is installed on said housing, and means sealingly fastening said bosses to their corresponding extensions.

2. The invention of claim 1:
said extensions including a tubular boss extending from said housing and circumscribing a corresponding aperture, and a tubular plug, one end of said plug being received within the corresponding extension on the housing, the other end of said plug being connected to the corresponding boss on the manifold.

3. The invention of claim 2:
the wall of each manifold boss on the manifold slidably engaging a corresponding wall of each of said plugs;
said fastening means including a detent on one of said walls received within a complementary recess on the other wall.

4. The invention of claim 3:
said other end of each of said plugs being received within a corresponding manifold boss;
said fastening means including a band clamped around the outer circumferential surface of each manifold boss to urge the latter into sealing engagement with the wall of its corresponding plug.

5. The invention of claim 2:
said one end of at least one of said plugs including a recessed portion, and valve means in said recessed portion to control communication through the corresponding aperture.

6. The invention of claim 5; and
a piston slidably mounted in said bore, said piston operating said valve means.

7. The invention of claim 2:
valve means located between at least one of said plugs and the housing; and
a piston slidably mounted in said bore, said piston operating each valve means.

8. The invention of claim 1:
said fastening means including a band clamped around the outer circumferential surface of each manifold boss to urge the latter into sealing engagement with the wall of its corresponding extension.

9. The invention of claim 8:
said extensions including a tubular boss extending from said housing and circumscribing a corresponding aperture, said fastening means clamping the boss on the manifold with a corresponding boss on the housing.

10. The invention of claim 1:

each of said extensions including a plug fastened to the housing and cooperating with the latter to define a cavity therebetween communicating with a corresponding boss on said manifold and with a corresponding aperture.

* * * * *